June 6, 1939.   M. D. McCARTY   2,161,744
GALVANOMETER
Filed July 9, 1938   2 Sheets-Sheet 2
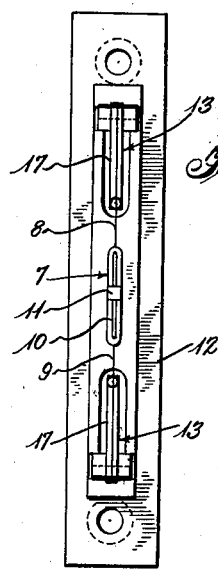
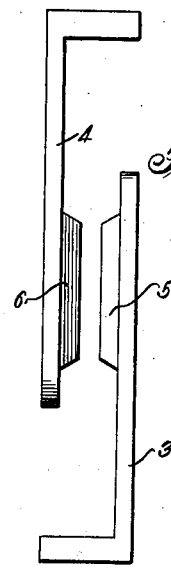
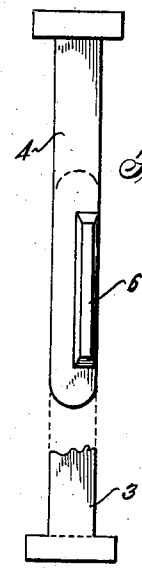
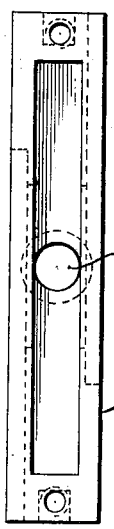
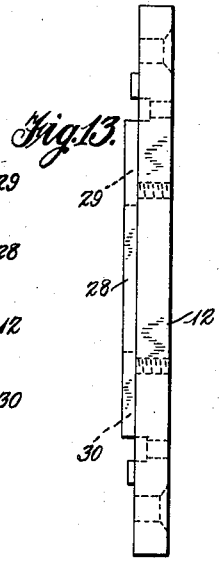
Inventor
*Malcolm D. McCarty*
By
*Dallas R. Lamont* Attorney Patented June 6, 1939

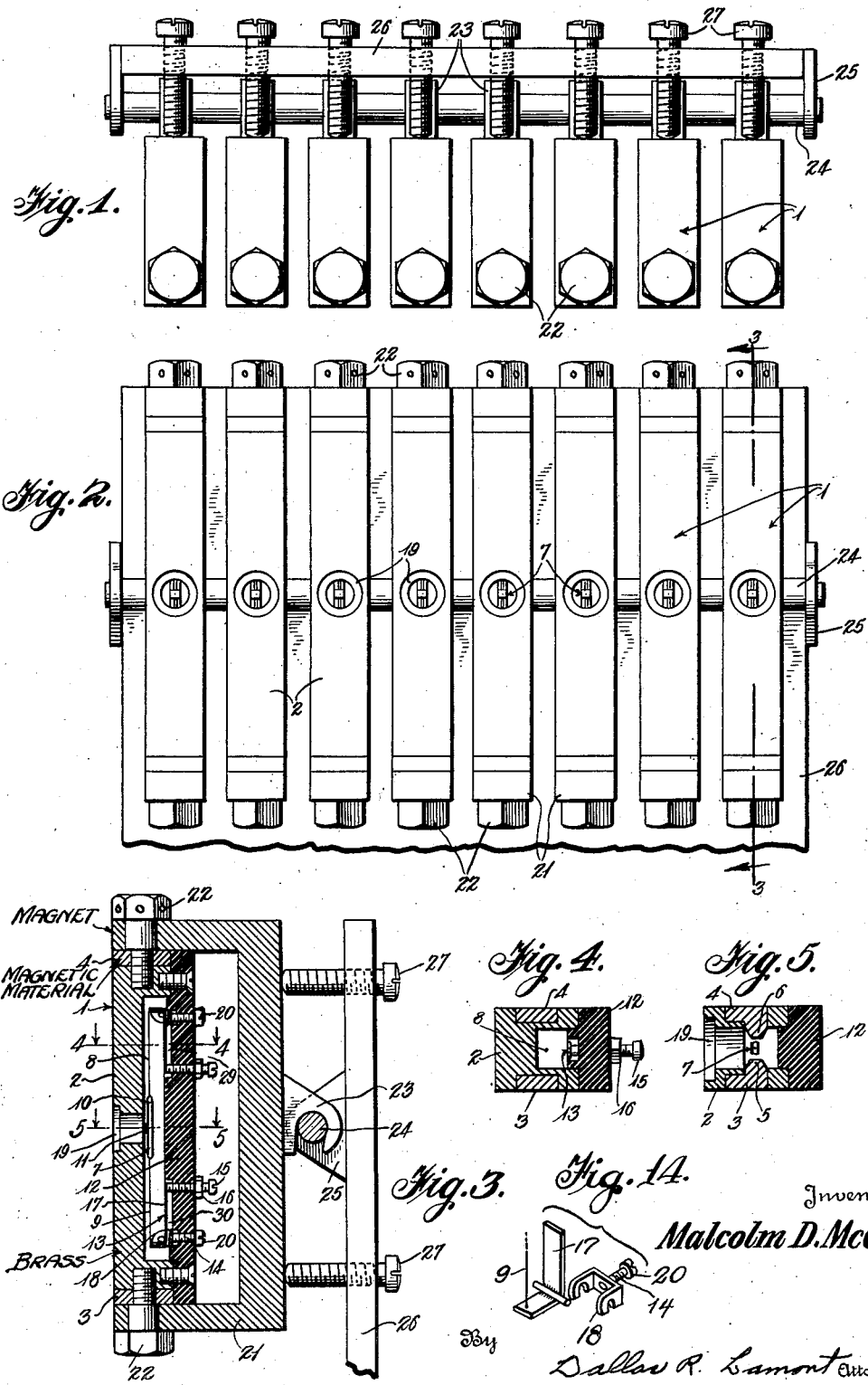

2,161,744

UNITED STATES PATENT OFFICE 2,161,744

GALVANOMETER

Malcolm D. McCarty, Dallas, Tex., assignor, by mesne assignments, to Socony-Vacuum Oil Company, Incorporated, New York, N. Y., a corporation of New York Application July 9, 1938, Serial No. 218,268

4 Claims. (Cl. 171—95)

This invention relates generally to galvanometers and more specifically to that type of galvanometer that is used in seismic surveying work in conducting surveys of the substrata of the earth's surface.

Heretofore, the problem confronting design engineers has been to design a galvanometer which would withstand rough treatment when exposed to conditions such as those encountered in field operation and yet record seismic data with the required accuracy. To obtain the very high degree of sensitivity required in instruments of this character, it is necessary to use very fragile vibrating elements which, when subjected to normal field work, will break occasionally, necessitating considerable delay in replacing the broken element. In many of the instruments designed to date, it has been necessary to abandon the use of that trace or to stop field operations and return the instrument to the laboratory where the ruptured element can be replaced. This is true particularly in instruments that employ a single body of damping fluid for damping all of the vibrating elements, for in most instances to effect a replacement of the ruptured element it would be necessary to remove the body of damping fluid to dismantle the case surrounding the vibrating elements. With galvanometers of this character, the work of replacing the element and properly adjusting the tension upon it is so tedious that it could hardly be accomplished in the field with such facilities as the instrument operator has at hand.

To overcome the difficulties inherent in those instruments of the type described above, applicant has invented a multiple element galvanometer having a plurality of separate units, each unit consisting of a case having a magnetic circuit made integral therewith and provided with means for mounting the vibrating element contained in the case in such a manner that, should one of the vibrating elements become ruptured, the entire unit can be readily removed and replaced by a new unit that is properly adjusted and damped if damping is required without the necessity of returning the entire instrument to the laboratory for repairs.

Additionally, each unit of the galvanometer is so designed and constructed that an independent body of damping fluid may be used for damping each element when fluid damping is required. In a galvanometer constructed in this manner each vibrating element is isolated and operates in its own body of fluid. This eliminates any tendency of the motion of one element being transmitted through the damping fluid to an adjacent element. Surrounding each element by separate cases provides an electrostatic shield for them.

Therefore, it is the primary object of this invention to provide a galvanometer having a plurality of vibrating elements, each of which is made as a separate unit.

Still another object of the invention is in the provision of a multiple galvanometer in which the vibrating elements, mounts, and body of damping fluid therefor when used are in the form of independent units that are interchangeable one with the other.

This invention further contemplates novel means for adjusting the tension on the vibrating element.

Still another object of this invention resides in the provision of a multiple galvanometer that is compactly constructed and readily portable.

This invention further contemplates the provision of a galvanometer having a plurality of vibrating elements, each of which is disposed in its own body of damping fluid and made as a separate unit.

Other objects and advantages of this invention will become apparent from the following detailed description when considered with the attached drawings, in which:

Fig. 1 is a plan view of the galvanometer showing the elements in their assembled position and their adjusting means;

Fig. 2 is a fragmentary vertical elevation of the galvanometer showing the elements assembled in operative relationship;

Fig. 3 is a sectional view taken along the line 3—3 of Fig. 2 showing in detail the vibrating element, its mount, and tensioning means;

Fig. 4 is a cross sectional view of the casing surrounding the vibrating element taken along the line 4—4 of Fig. 3;

Fig. 5 is a cross sectional view of the casing surrounding the vibrating element taken along the line 5—5 of Fig. 3;

Fig. 6 is a detailed elevation of the vibrating element mount;

Fig. 7 is an elevational view of the soft iron conductors that are made integral with the vibrating element case;

Fig. 8 is a side elevation of the soft iron conductors showing the inner end of one broken away to disclose the configuration of the pole face of the other;

Fig. 9 is a detailed view of the vibrating element case with the vibrating element and its mount removed therefrom showing in dotted lines the disposition of the soft iron conductors which are made integral with the case;

Fig. 10 is a side elevation of the vibrating element case shown in Fig. 9;

Fig. 11 is a top end view of the vibrating element case;

Fig. 12 is a detailed elevational view of the vibrating element mount with the means for securing the vibrating element thereto removed;

Fig. 13 is a side elevation of the vibrating element mount as shown in Fig. 12, and Figure 14 is a perspective view of the element adjusting means and its mount.

Referring to the drawings in detail, particularly Figs. 1 and 2, there are shown a plurality of independently mounted units 1, each of which operates independently of the others to produce its own seismographic trace. Since the optical system that is used with a galvanometer of this character is conventional, it has been omitted from the drawings for the purpose of simplicity of disclosure. As shown in Fig. 3, the unit 1 consists of a brass case 2 that has made integrally therewith magnetic flux conductors 3 and 4 of high permeability that have formed on the inner ends thereof pole faces 5 and 6, respectively (Fig. 7). The pole faces are so formed that they are disposed directly opposite each other and are spaced one from the other sufficiently far that the vibrating element 7, Figs. 3 and 6, can move freely in the air gap thus created with adequate clearance on either side thereof. The vibrating element 7 is of conventional type and is shown in detail in Fig. 6. This element consists of the leader wires 8 and 9, the coil 10, and mirror 11. The outer ends of the leader wires 8 and 9 are secured to springs that in turn are secured to a Bakelite strip 12 which forms a closure for the casing 2, by tensioning means 13 carried by the screw 14 that passes through the Bakelite strip 12. The tensioning means 13 comprises screws 15, their associated locking nuts 16, and the bell cranks 17 that are pivotally carried by the elements 18 which are secured in operative position by the screws 14. In the construction of the device, the leader wires of the vibrating element 8 and 9 are secured to the short arms of the bell cranks 17 at the top and bottom, respectively. By adjusting the screws 15 the position of the mirror 11 with respect to the center of the optical system and lens 19 can be adjusted and at the same time the proper tension can be placed on the leader wires 8 and 9. Before the Bakelite strip, on which is mounted the vibrating element, is placed in position to serve as a closure for the casing 2, a suitable damping fluid such as oil if desired may be placed in the casing 2. Then the strip 12 that forms the closure for the casing 2 is placed in position and sealed.

The signal that it is desired to record by means of the vibrating element 7 is supplied through the conductors 20 that are secured to the screws 14 with detachable fasteners such as, for example, the spade type clips.

After the unit 1 has been assembled as described above, it is secured between the pole tips of a magnet 21 which may be either an electro-magnet or a permanent magnet by means of screws 22. The high permeability conductors 3 and 4 are connected directly to the pole faces of the element 21 and serve as pole tips therefor.

As shown in Figs. 1 and 3, the individual magnets are provided with a hook 23 that is made integral with the magnet 21 or secured thereto by welding or screws. Hook 23 is adapted to fit over a rod 24. Rod 24 has its ends directly secured to arms 25 extending from a vertical support 26. Mounted in this manner, a separate pivotal mounting is provided for each unit. Adjusting screws 27 that are in threaded engagement with the vertical support 26 hold the units in adjusted position on their pivotal support.

Additionally, the assembled unit 1 is so disposed between the arms of the magnet 21 that it is possible to rotate it about its vertical axis for the purpose of adjustment. This is accomplished by loosening the screws 22 and turning the unit manually to the adjusted position.

As mentioned above, the high permeability magnetic conductors 3 and 4 having formed on their inner ends the pole faces 5 and 6, respectively, are made integral with the casing 2. The casing 2 is formed of any non-magnetic material such, for example, as brass, which, when subjected to well-known welding processes can be united with the high permeability magnetic conductors to form a composite structure. The disposition of the high permeability magnetic conductors with respect to the brass casing 2 is illustrated in Figs. 4, 5, 9, 10, and 11, while the detailed construction of the high permeability magnetic paths alone are clearly shown in Figs. 7 and 8.

In Figs. 12 and 13, as well as Fig. 3, the detailed construction of the vibrating element mount is shown. In these figures, the outer portion of the inner surface of the Bakelite strip is milled down to provide a bearing for the edges of the casing 2, thereby leaving a portion 28 extending into the casing when the strip is secured in operative position. Recesses 29 and 30 are provided in the inner surface of this inwardly-extending portion for the purpose of receiving the vibrating element mounts and the adjustments therefor.

From the above description it becomes apparent that the individual units with their magnets secured to them can be prepared and properly adjusted in the laboratory. Additionally, complete units other than those mounted in the apparatus can be carried by the operator as spare elements that can be used to replace any element which has become defective for any reason while in operation. To replace a single element, it is only necessary to loosen one or both of the screws 27 and unhook the element from the rod 24, then after detaching the electrical connections replace the new element in the same manner, tighten the screws 27 to their adjusted position, and make the electrical connections.

I claim:

1. A multiple galvanometer comprising in combination a plurality of vibrating elements, separate means for enclosing each of said elements, high permeability magnetic conductors made integrally with said closure means and having formed on the inner ends thereof pole faces, independent sources of magnetic flux connected to the outer end of each of said conductors, and means carried by said sources of magnetic flux for independently pivotally mounting the vibrating elements, their enclosing casings, and sources of magnetic flux as a unit in operative position.

2. A multiple galvanometer comprising in combination a plurality of independent vibrating elements, independent means for damping the respective elements, each of said vibrating elements comprising a coil adapted to be suspended in a magnetic field, means for suspending said coil, and common means for adjusting the tension on the suspension means for the coil and adjusting the position of the coil.

3. A multiple galvanometer comprising in combination a plurality of independent units, each of said units consisting of a non-magnetic housing, magnetic pole pieces compositely formed in the sides of said housing, a source of magnetic flux secured to the pole pieces, a lens fixed in one wall of the housing opposite the air gap formed by the pole pieces, a coil disposed within the air gap, suspension means for the coil, a mirror carried by the coil and disposed opposite the opening in said housing and said lens, and common means for adjusting the position of the coil relative to the opening in said housing and said lens and for changing the tension on the suspension members.

4. In a multiple galvanometer comprising in combination a plurality of independent units, means for independently, pivotally, and detachably mounting said units in operative position, said mounting means comprising vertical supporting means, a horizontal rod carried by but spaced from said supporting means, hook means fixed to the back of each unit adapted to engage the rod and be pivotally carried thereby, and means extending through the supporting means and engaging each unit whereby vertical adjustment of each unit can be effected.

MALCOLM D. McCARTY.